US011574536B2

(12) United States Patent
Saurin et al.

(10) Patent No.: US 11,574,536 B2
(45) Date of Patent: Feb. 7, 2023

(54) TECHNIQUES FOR DETECTING SENSOR INPUTS ON A WEARABLE WIRELESS DEVICE

(71) Applicant: Intel Corporation, Santa Clara, CA (US)

(72) Inventors: Shah Saurin, Portland, OR (US); Lakshman Krishnamurthy, Portland, OR (US); Francis M. Tharappel, Portland, OR (US); Saurabh Dadu, Tigard, OR (US); Brian K. Vogel, Santa Clara, CA (US); Swarnendu Kar, Portland, OR (US); Michael R. Bynum, Portland, OR (US); Prabhakar R. Datta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/497,336

(22) Filed: Oct. 8, 2021

(65) Prior Publication Data

US 2022/0092968 A1 Mar. 24, 2022

Related U.S. Application Data

(63) Continuation of application No. 16/530,403, filed on Aug. 2, 2019, now Pat. No. 11,145,188, which is a (Continued)

(51) Int. Cl.

| | |
|---|---|
| ***H04B 1/38*** | (2015.01) |
| ***G08C 17/02*** | (2006.01) |

(52) U.S. Cl.

CPC ......... *G08C 17/02* (2013.01); *G08C 2201/31* (2013.01); *G08C 2201/32* (2013.01); *G08C 2201/93* (2013.01)

(58) Field of Classification Search

CPC ................ G08C 17/02; G08C 2201/31; G08C 2201/32; G08C 2201/93

(Continued)

(56) References Cited

U.S. PATENT DOCUMENTS

| | | | |
|---|---|---|---|
| 6,028,537 | A | 2/2000 | Suman et al. |
| 6,510,325 | B1 | 1/2003 | Mack et al. |

(Continued)

FOREIGN PATENT DOCUMENTS

| | | | |
|---|---|---|---|
| CN | 1922651 | A | 2/2007 |
| CN | 102906623 | A | 1/2013 |
| CN | 102944889 | A | 2/2013 |

OTHER PUBLICATIONS

PCT International Preliminary Reporton Patentability in PCT International Application Serial No. PCT/US2014/066039 dated Jun. 28, 2016 (8 pages).

(Continued)

*Primary Examiner* — Naomi J Small

(74) *Attorney, Agent, or Firm* — Alliance IP, LLC

(57) ABSTRACT

Various embodiments are generally directed to an apparatus, method and other techniques for detecting, by one or more sensor components, at least one sensor input, and executing, by logic, at least one instruction to cause an event on a wearable wireless device, the event comprising at least one of a change in a physical parameter on the wearable wireless device and a wireless communication with a computing device via a transceiver.

20 Claims, 10 Drawing Sheets

240

Related U.S. Application Data continuation of application No. 14/141,384, filed on Dec. 26, 2013, now Pat. No. 10,417,900.

(58) Field of Classification Search
USPC ........................................................ 340/5.61
See application file for complete search history.

(56) References Cited

U.S. PATENT DOCUMENTS

| | | | | |
|---|---|---|---|---|
| 6,971,072 | B1 | 11/2005 | Stein | |
| 8,006,002 | B2 | 8/2011 | Kalayjian et al. | |
| 8,392,007 | B1 | 3/2013 | Izo et al. | |
| 8,854,925 | B1 | 10/2014 | Lee et al. | |
| 2002/0169539 | A1 | 11/2002 | Menard et al. | |
| 2003/0025670 | A1 | 2/2003 | Barnett et al. | |
| 2004/0029558 | A1 | 2/2004 | Liu | |
| 2004/0127198 | A1 | 7/2004 | Roskind et al. | |
| 2005/0221791 | A1 | 10/2005 | Angelhag | |
| 2006/0060762 | A1 | 3/2006 | Chan et al. | |
| 2007/0003098 | A1 | 1/2007 | Martenson et al. | |
| 2007/0075965 | A1 | 4/2007 | Huppi et al. | |
| 2007/0099602 | A1 | 5/2007 | Kurlander et al. | |
| 2007/0197878 | A1 | 8/2007 | Shklarski | |
| 2008/0113689 | A1* | 5/2008 | Bailey ................. | H04M 1/6066<br>455/569.1 |
| 2008/0140868 | A1 | 6/2008 | Kalayjian et al. | |
| 2009/0040233 | A1 | 2/2009 | Yamamoto | |
| 2009/0048044 | A1* | 2/2009 | Oleson ..................... | A43B 5/00<br>473/570 |
| 2009/0171180 | A1 | 7/2009 | Pering et al. | |
| 2009/0215439 | A1 | 8/2009 | Hamilton et al. | |
| 2009/0252344 | A1 | 10/2009 | Mao et al. | |
| 2010/0188328 | A1 | 7/2010 | Dodge et al. | |
| 2010/0214118 | A1 | 8/2010 | Losee et al. | |
| 2011/0045736 | A1 | 2/2011 | Wooten | |
| 2011/0211035 | A1 | 9/2011 | Ota et al. | |
| 2011/0221656 | A1 | 9/2011 | Haddick et al. | |
| 2012/0221254 | A1 | 8/2012 | Kateraas et al. | |
| 2013/0106684 | A1 | 5/2013 | Weast et al. | |
| 2013/0119255 | A1 | 5/2013 | Dickinson et al. | |
| 2013/0342669 | A1 | 12/2013 | Hsu | |
| 2014/0107919 | A1 | 4/2014 | Venkatraman et al. | |
| 2014/0143785 | A1* | 5/2014 | Mistry .................. | G06F 9/5044<br>718/104 |
| 2014/0197946 | A1 | 7/2014 | Park et al. | |
| 2014/0293755 | A1 | 10/2014 | Geiser et al. | |
| 2014/0334271 | A1 | 11/2014 | Park et al. | |
| 2014/0341441 | A1* | 11/2014 | Slaby .................. | G06V 40/193<br>382/117 |
| 2015/0057968 | A1 | 2/2015 | Bailey et al. | |

OTHER PUBLICATIONS

PCT International Search Report and Written Opinion received for PCT Patent Application No. PCT/US2014/066039 dated Feb. 11, 2018 (10 page).

State Intellectual Property Office of China First Office Action in CN Application Serial No. 201480064580.3 dated Feb. 14, 2018 (16 pages).

State Intellectual Property Office of China Second Office Action in CN Application Serial No. 201480064580.9 dated Oct. 9, 2018 (11 pages).

State Intellectual Property Office of China Third Office Action in Chinese Application Serial No. 201480064580.9 dated Apr. 2, 2019 (4 pages).

* cited by examiner

240

260

280

400

TECHNIQUES FOR DETECTING SENSOR INPUTS ON A WEARABLE WIRELESS DEVICE

CROSS-REFERENCE TO RELATED APPLICATIONS

This application is a continuation of U.S. patent application Ser. No. 16/530,403 filed Aug. 2, 2019, entitled "TECHNIQUES FOR DETECTING SENSOR INPUTS ON A WEARABLE WIRELESS DEVICE", which is a continuation of U.S. patent application Ser. No. 14/141,384 filed Dec. 26, 2013, entitled "TECHNIQUES FOR DETECTING SENSOR INPUTS ON A WEARABLE WIRELESS DEVICE", the disclosures of which are hereby incorporated by reference in their entirety.

This application relates to International Patent Application entitled "TECHNIQUES FOR DETECTING SENSOR INPUTS ON A WEARABLE WIRELESS DEVICE," international application no. PCT/US14/66039, filed Nov. 18, 2014. The contents of the aforementioned application are incorporated herein by reference.

TECHNICAL FIELD

Embodiments described herein generally relate to techniques for detecting one or more inputs via one or more sensors on a computing device. More specifically, techniques may include detecting sensor inputs via a wearable wireless device comprising one or more sensors.

BACKGROUND

Cost, comfort, and simplicity of operation are important factors in many consumer electronics. Telephone headsets are one example of useful devices that are often burdened by a relatively large size and overly complicated operation. These devices typically include buttons and other controls that, while providing functionality, make use complicated and drive up the cost and weight of the device. For example, headsets might have individual controls for answering and terminating calls, controlling volume, and powering on/off. In the case of headsets, which typically mount onto a user's ear, the added weight and size from these controls might lead to a less comfortable fit. Another common problem with these devices is related to battery life. Even after a user has completed a call, the user often forgets to turn off the device. Thus, a significant amount of power is used, reducing the operating time of the headset.

DETAILED DESCRIPTION

Figure 1:
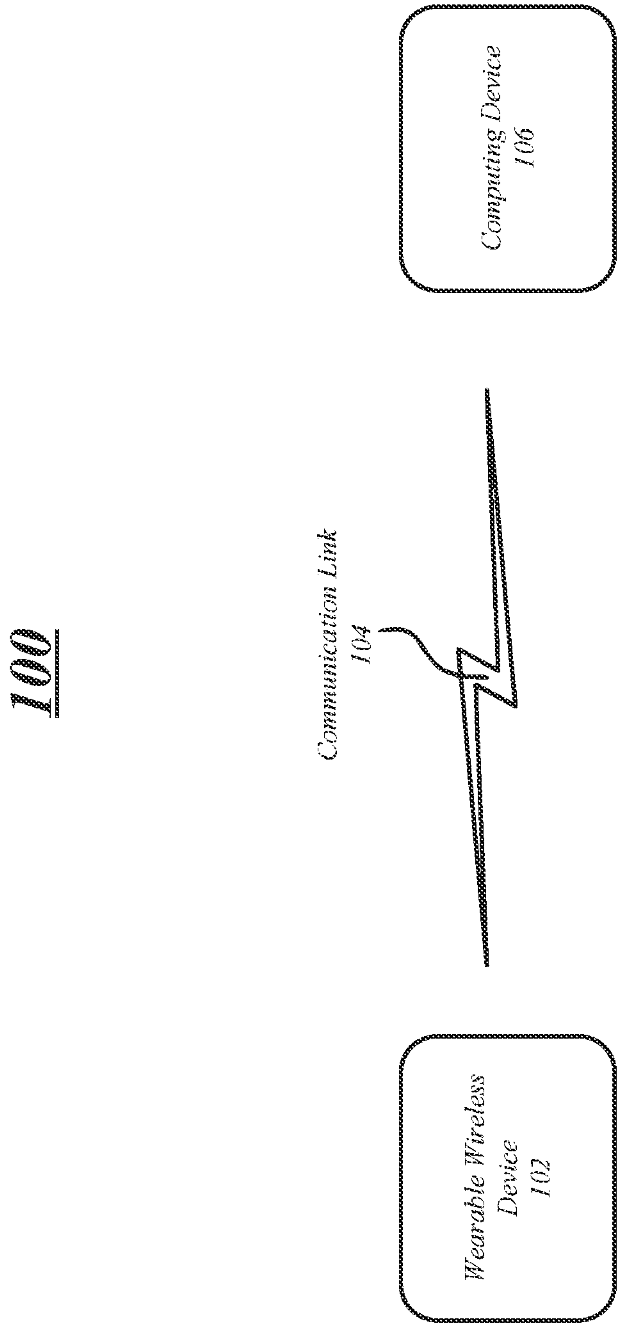
FIG. 1 illustrates an embodiment of a first system.

As previously discussed, many headsets today include one or more buttons for a user to answer calls, change the volume and control other features. However, these buttons make the headset quite cumbersome and uncomfortable for the user to operate and wear. Thus, various embodiments are generally directed to a wearable wireless device, such as a headset, that includes one or more sensors to detect one or more inputs for a user to interact with the device. More specifically, these one or more sensors may detect sensor inputs, such as a motion input, position input, direction input, touch or tap input, sound input, image input, and so forth. In addition, the one or more sensors may detect other sensor inputs, such as a user at a threshold distance from the wearable wireless device, a heart rate or beat of the user and a body temperature of the user. While described herein for purposes of illustration in terms of a headset or headset wearable device, it should be understood that the embodiments are not limited in this respect and any suitable wearable and/or body mounted computing device could be used and still fall within the described embodiments.

In various embodiments, sensor inputs may enable a user to interact with the wearable wireless device without pressing one or more buttons, toggling one or more switches, and so forth. More specifically, the wearable wireless device may include a processing component or processor to execute one or more instructions to cause an event based on the detected one or more sensor inputs. For example, a sensor may detect a sensor input and communicate information such as a signal to the processor. The processor may receive the information from the sensor and execute instructions to cause an event associated with the detection on the wearable wireless device. As described herein, a sensor input may include any input detected by a sensor or sensor component devoid of the use of a button, toggle, switch and so forth.

An event may include, but is not limited to, changing a volume of sound output, answering or hanging-up a telephone call, enabling or disabling hands-free communication on the wearable wireless device, entering or exiting a lower power mode, communicating with a coupled computing device, and so forth. In some embodiments, the processor may receive information from the one or more sensors and process the information with an algorithm, such as an audio classification algorithm and image identification algorithm to determine an environmental context for the user. The environmental context may indicate whether the user is in busy or noisy place, a quite setting, and so forth and the processor may cause an event based on the environmental context. For example, the processor may increase or decrease the volume sound output based on whether the user is in noisy place or not.

In some embodiments, the processor may receive information from the one or more sensors and determine a physical context for the user. The physical context may include determining if the user is standing, walking, running, biking, climbing, riding in a vehicle, and so forth. The processor may determine the physical context of the user and cause an event on the wearable wireless device based on the physical context. For example, the processor may determine that a user is biking based on information received from one or more of a motion sensor, gyroscope sensor, and a compass sensor and may enable hands-free communication on the wearable wireless device.

In some embodiments, a combination of sensors and inputs may be used by the processor to increase the accuracy of the inputs and determine which event to invoke. For example, a sound input of a user tapping or touching the device may be used in combination with a touch sensor or an accelerometer detecting the actual tapping or touching of the device. Thus, by using these two sensors and inputs in conjunction with each other, the processor may more accurately determine which event to invoke on the device. For example, the processor may be able to further differentiate between a single tap and a double tap. Various embodiments are not limited to these examples and further details will become more apparent with the following description.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of a system 100 suitable for implementing various embodiments described herein. The system 100 includes a wearable wireless device 102 and a computing device 106. Further, the wearable wireless device 102 may communicate with the computing device 106 over communication link 104.

The wearable wireless device 104 may be any computing device capable of being worn by a user. For example, the wearable wireless device 104 may be a headset device that a user may be able to wear on a body part such as an ear. However, various embodiments are not limited in this manner, and the wearable wireless device 104 may be any device a user may wear such as, a glasses device, a watch device, a ring device, and so forth.

Further and as will be discussed in more detail below, the wearable wireless device 104 may include any number of components and sensors to detect one or more inputs, such as a sensor input to cause one or more events on the wearable wireless device 102. As previously discussed, a sensor input may include any input detected by a sensor or sensor component devoid of the use of a button, toggle, switch and so forth. Moreover, in various embodiments the wearable wireless device 102 may be devoid of any buttons, switches, toggles or other inputs, but may instead rely on the one or more sensors to detect inputs and cause events on the device. However in other embodiments, the wearable wireless device 102 may include one or more buttons to receive one or more inputs. Further, an event may include the communicating information with the computing device 106 and changing one or more physical parameters, such as a changing a volume, answering or hanging-up a telephone call, enabling or disable music playback, switching between modes of operation including power modes (on, off, lower power, full power, etc.) and hands-free modes, and so forth. Various embodiments are not limited in this manner, and sensor inputs may trigger other events to occur on the wearable wireless device.

In one example, a sensor input may be detected and cause an event on the wearable wireless device 102 such as changing a mode of operation including entering or exiting a lower power mode of operation. In another example, one or more inputs may change, enable and disable telephonic communications on the wearable wireless device 102. In a third example, the wearable wireless device 102 may communicate information such as position information and direction information with the computing device 106 over communications link 104 based on one or more inputs. In a fourth example, settings and configuration information for the wearable wireless device 102 may be changed based on one or more of physical context information and environmental context information received by the one or more sensors and determined by a processor. As will be discussed in more detail below, various embodiments are not limited to the above-recited examples.

Computer system 100 may also include a computing device 106 that may communicate with the wearable wireless device 102. Computing device 106 may include any type of computing device, such as a personal digital assistant, a mobile computing device, a smart phone, a cellular telephone, a handset, a one-way pager, a two-way pager, a messaging device, a computer, a laptop computer, a notebook computer, a handheld computer, a tablet computer, a network appliance, a web appliance, multiprocessor systems, processor-based systems, or any combination thereof. The embodiments are not limited in this context. For example, the computing device 106 may include a hands-free device in an automobile, in-dash infotainment system, and the like.

Further and as previously discussed, the wearable wireless device 102 may communicate information with the computing device 106 via the communication link 104. The information may be communicated between the wearable wireless device 102 and computing device 106 as one or more signals, which in-turn may be converted into instructions for execution on the wearable wireless device 102 and the computing device 106.

The information may include telephone information, position information, audio information, instructional information, direction information, and so forth. For example, the wearable wireless device 102 may communicate direction and/or position information to the computing device 106 and the computing device 106 may communicate turn-by-turn direction information providing a user with directions to a specific location through the wearable wireless device 102. The turn-by-turn directions may be received by the wearable wireless device as one or more signals and converted into an audio format to be played through a speaker. In another example, the wearable wireless device 102 may communicate information to the computing device 106 that the wearable wireless device 102 is operating in a telephone mode and the computing device 106 may send telephone information as one or more signals to the wearable wireless device 102. The telephone information communicated between the wearable wireless device 102 and computing device 106 may include voice information such that a user may hear and speak with another person through the wearable wireless device 102. Various embodiments, are not limited to the above-recited examples, the wearable wireless device 102 may communicate any type of information with the computing device 106.

As previously stated, the communication link 104 may provide communication capabilities between the wearable wireless device 102 and the computing device 106 and may include any number of wired or wireless communication links and support any number of communication protocols. In various embodiments, the communication link 104 or portion thereof may be a secure communication link using various encryption methods to prevent data or information from being compromised. In addition, the communication link 104 may communicate information in accordance with different types of shorter range wireless systems, such as a wireless personal area network (PAN) system. One example of a suitable wireless PAN system offering data communication services may include a BLUETOOTH® system operating in accordance with the BLUETOOTH® Special Interest Group (SIG) series of protocols. Other examples may include systems using infrared techniques or near-field communication techniques and protocols, such as electro-magnetic induction (EMI) techniques.

Figure 2A:
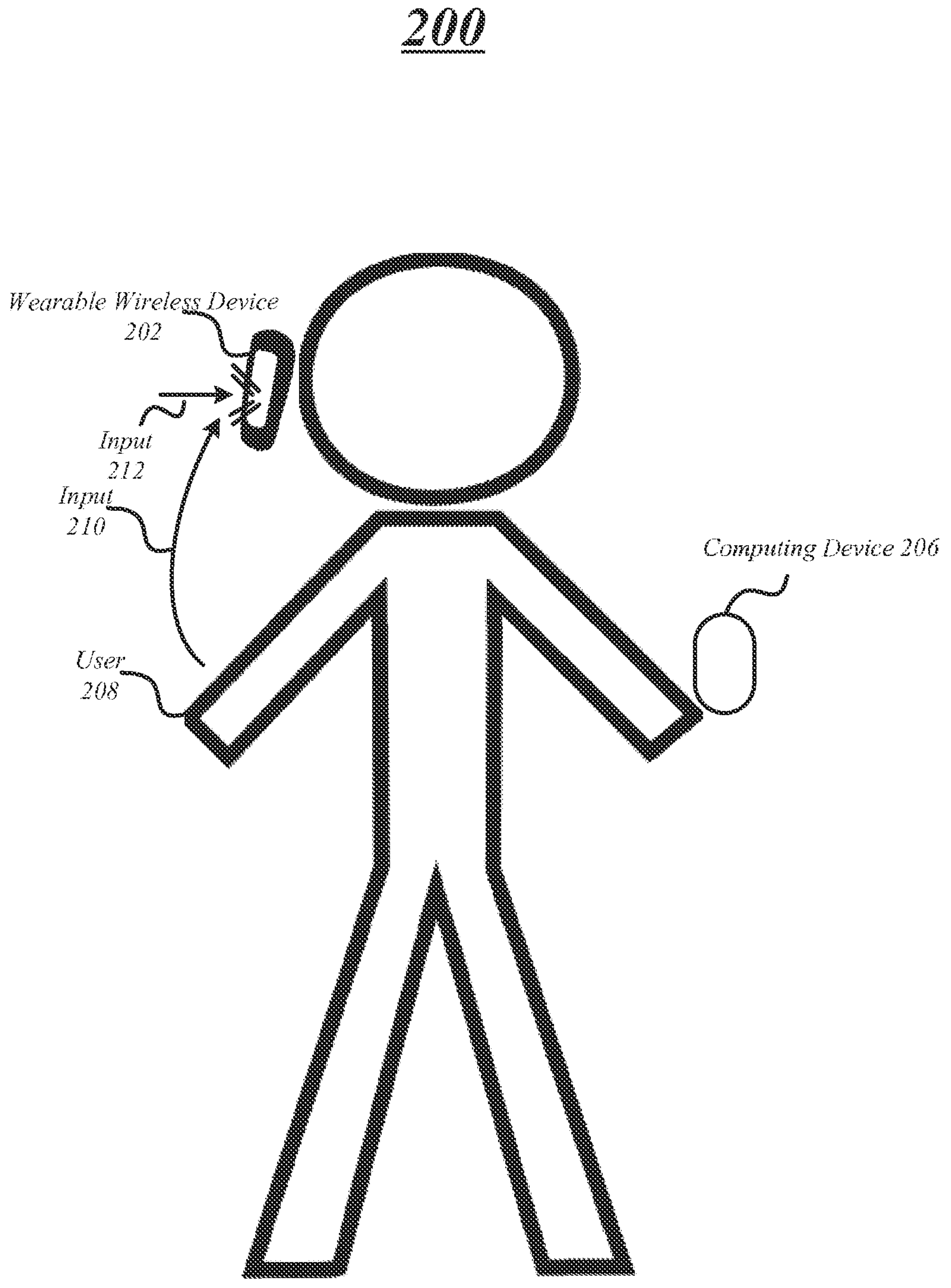
FIG. 2A illustrates an exemplary embodiment of a first input detection diagram.

FIG. 2A illustrates an exemplary embodiment of an input detection diagram 200 including a wearable wireless device 202 attached or coupled with a user 208. Further, the wearable wireless device 202 may be coupled with computing device 206 via a communication link, such as communication link 104 of FIG. 1. The input detection diagram illustrates the wearable wireless device 202 detecting two inputs 210, 212. However, various embodiments are not limited to the detection of two inputs and the wearable wireless device 202 may detect any number of inputs.

In this example, input 210 may be a touch or tap input and input 212 may be an audio or sound input of the touch or tap input. More specifically, the wearable wireless device 202 may include an accelerometer to detect one or more touches or taps on the device and a microphone to detect audio or sound information created by the touching or tapping on the wearable wireless device 202. In response to receiving one or both of the touch input 210 and the sound input 212, one or more events may occur on the wearable wireless device 202.

For example, the volume of audio output may be adjusted up or down based on the one or more inputs. More specifically, a single touch input may cause the audio output volume to increase and a double tap input may cause the audio output volume to decrease. Various embodiments are not limited to this example, and various touch or tap inputs 210 may cause different events, such as answering or hanging up a telephone call on the computing device 206 or browsing music on the computing device 206. More specifically, the wearable wireless device 202 may communicate information with the computing device 206 to answer or hang-up a telephone call or browse music in a specific order (front-to-back or back-to-front).

In some embodiments, an event may occur when only the touch input 210 is received or detected by the wearable wireless device 202. However, in the same or other embodiments, the sound input 212 may be used to confirm the touch input 210. The wearable wireless device 202 may only execute the event if both the audio input 212 is detected by a microphone and the touch input 210 is detected by the accelerometer. By using both inputs 210, 212, the wearable wireless device 202 may increase the accuracy of the occurrence of the touch or tap input 210 and limited false positive detections.

Figure 2B:
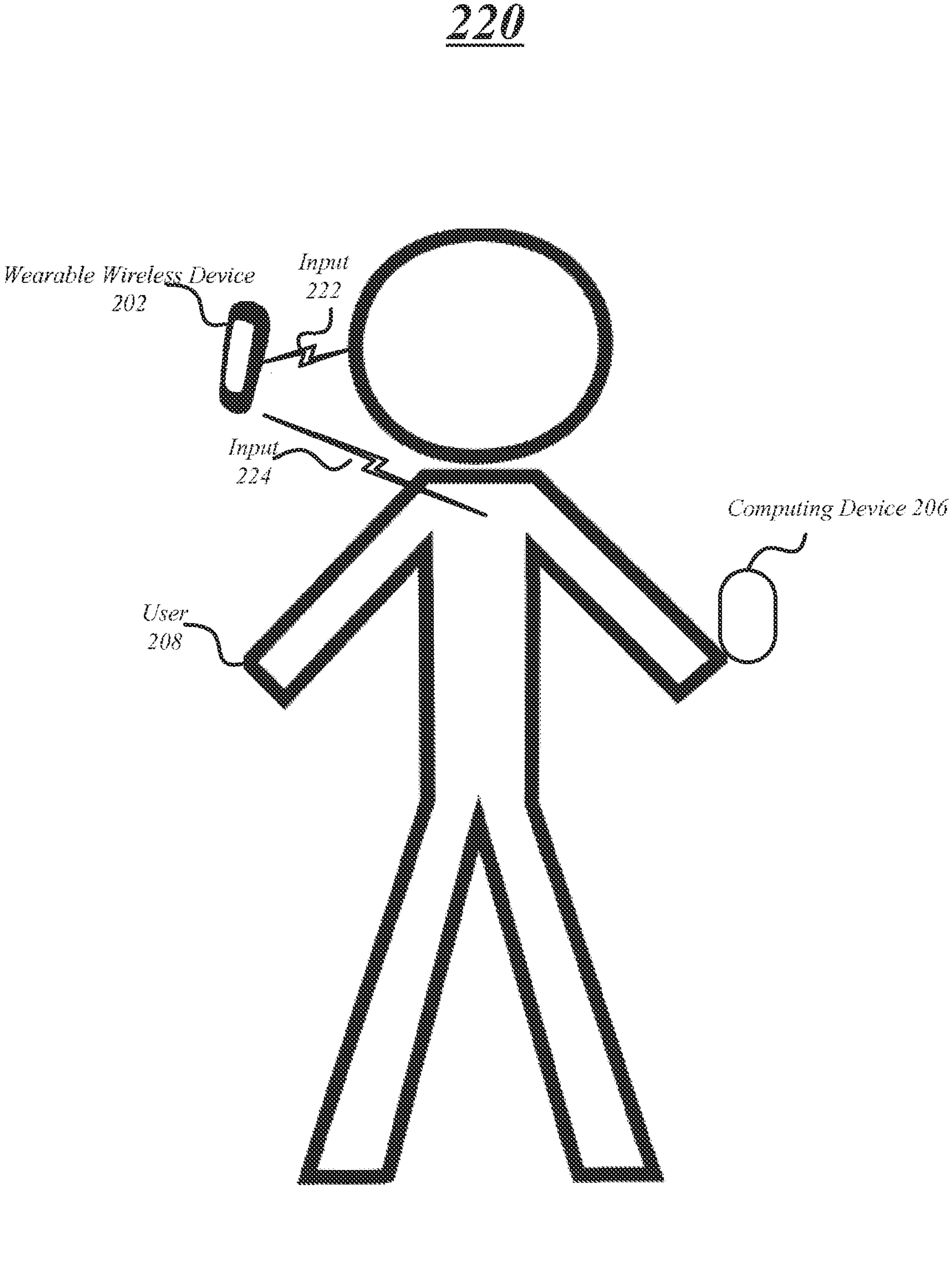
FIG. 2B illustrates an exemplary embodiment of a second input detection diagram.

FIG. 2B illustrates an exemplary embodiment of an input detection diagram 220 including a wearable wireless device 202 in proximity with a user 208. Further, the wearable wireless device 202 may be coupled with computing device 206 via a communication link, such as communication link 104 of FIG. 1. The input detection diagram illustrates the wearable wireless device 202 detecting two inputs 222, 224.

In this example, input 222 may be a detection of the user 208 within a threshold distance of the wearable wireless device 202 via a proximity sensor. The threshold distance may be any distance including one or more feet, inches, meters, centimeters, and so forth. In various embodiments, the threshold distance may be a limited by the capabilities of the sensor, may be a default distance or determined by a user of the wearable wireless device.

In addition, input 224 may be a biometric detection of the user 208 via one or more biometrics sensors such as a heart rate detection sensor and a thermal sensor. For example, the biometric sensor may be a heart rate detection sensor that may detect the presence of a heartbeat of the user 208. In another example, the biometric sensor may be a thermal sensor that may detect a thermal body temperature of the user 208. In some embodiments, the wearable wireless device may include both a heart rate detection sensor and a thermal sensor.

The detection of one or both inputs 222 and 224 may cause one or more events to occur on the wearable wireless device 202. For example, the detection of a user within a threshold distance may cause a transition for a lower power mode of operation to a full power mode of operation. More specifically, the detection of the user within the threshold distance may indicate that the user 208 is placing the wearable wireless device 208 on a body part, such as an ear and a full power mode may be enabled. In the full power mode, telephone communication functionality may be enabled and the wearable wireless device 202 device may receive information such as voice communication information from the computing device 206.

In another example, the proximity sensor may detect the lack of a presence of the user 208 and the lower power mode of operation may be enabled for the wearable wireless device 202. The lower power mode may allow the wearable wireless device 202 to save power and prolong battery life of a battery.

In some embodiments, one or more events may occur when only the proximity input 222 is detected. However, in the same or other embodiments, the biometric input 224 be used to confirm the proximity input 222. More specifically, the biometric input 224 may include the detection of a heartbeat and/or a temperature of a user further verifying that the user 208 is within proximity of the wearable wireless device 202. In these embodiments, only when both inputs 222 and 224 are detected will the one or more events occur on the wearable wireless device 202.

Figure 2C:
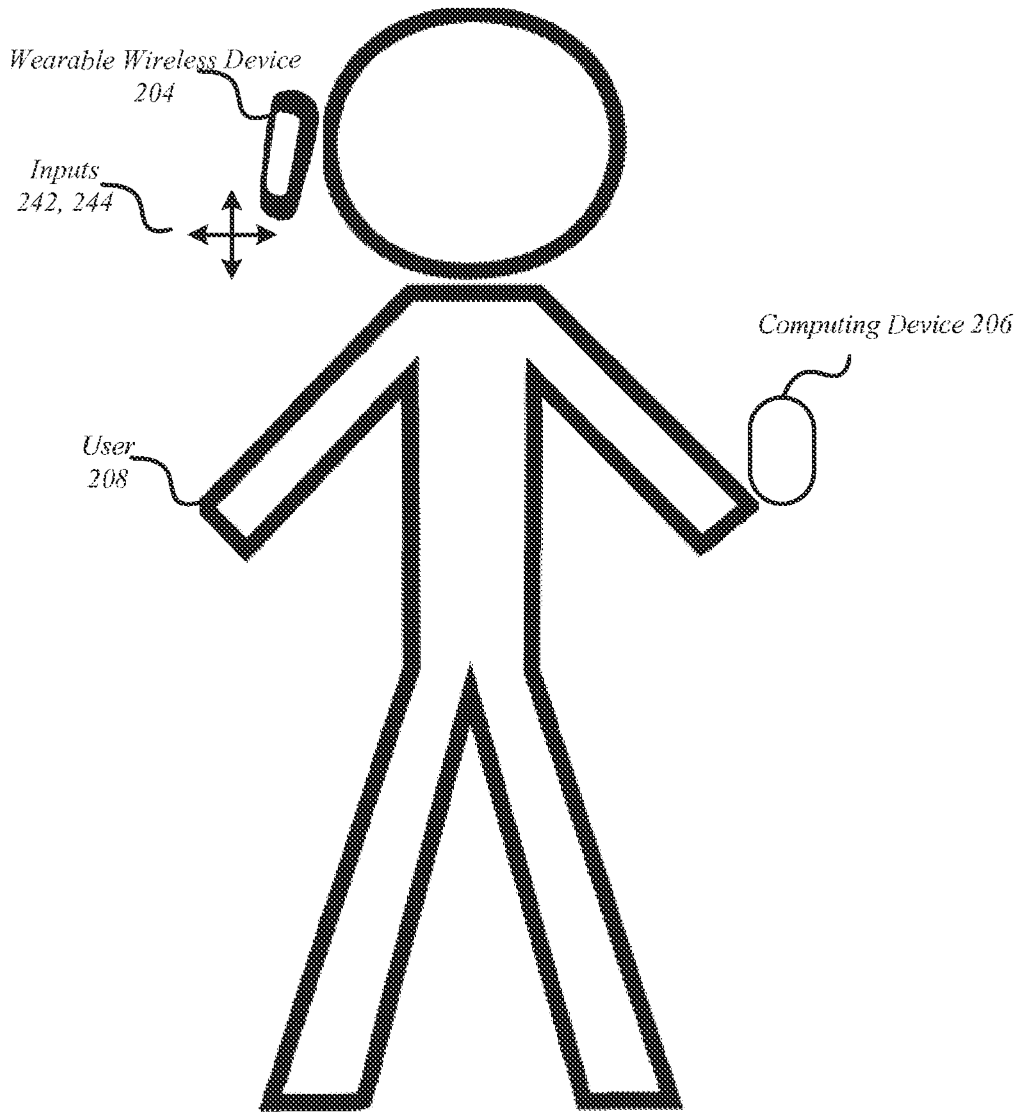
FIG. 2C illustrates an exemplary embodiment of a third input detection diagram.

FIG. 2C illustrates an exemplary embodiment of an input detection diagram 240 including a wearable wireless device 202 attached with or coupled to a user 208. Further, the wearable wireless device 202 may be coupled with computing device 206 via a communication link, such as communication link 104 of FIG. 1. The input detection diagram illustrates the wearable wireless device 202 detecting two inputs 242, 244.

The wearable wireless device 202 may include an accelerometer, a gyroscope and a magnetometer (or compass) to detect motion, position and direction, respectively. In some embodiments, these sensors may be included in a nine-axis sensor. In the illustrated exemplary embodiment, input 242 may be a position input detected by the gyroscope and input 244 may be a direction input detected by the magnetometer.

In some embodiments, the detection of one or more inputs may cause one or more events such as the communication of information with the computing device 206. For example, the position input 242 and the direction input 244 may be communicated to the computing device 206. In response, the wearable wireless device 202 may receive information from the computing device 206, such as turn-by-turn direction information to be played through a speaker and to provide directions to another location. The wearable wireless device 202 may also receive audio cue information that may be played through a speaker and to provide information about attractions in the nearby area. Various embodiments are not limited in this manner and other information may be communicated with the computing device 206.

Further, other events may occur on the wearable wireless device 202 based on the location input 242 and direction input 244 along with inputs detected by the accelerometer. More specifically, the wearable wireless device 202 may determine a physical context based on the inputs. For example, the physical context may describe whether the user 208 is walking, jogging, biking and running, and so forth based on the inputs detected by the accelerometer, gyroscope and magnetometer. More specifically, a high speed and high motion detected by these sensors, in combination or alone, may indicate that the user 208 is running. Further, an even higher speed and motion may indicate that the user is biking.

In some embodiments, motion threshold values may be set to determine whether a user is standing, walking, jogging, biking, etc. For example, one value may be set to determine when a user transitions from standing to walking. For example, a determined amount of motion sensed by the accelerometer may indicate that a user is walking and a motion threshold value may be set at this determined amount of motion. Motions thresholds may be set to indicate each of the transitions from standing, to walking, to jogging, and to biking.

The physical context information may be used to adjust or control various setting or configurations on the wearable wireless device 202. For example, the wearable wireless device 202 may adjust the sound output volume up or down based whether a user is walking, jogging, running, biking and so forth. Various embodiments are not limited in this manner and other settings and configurations may be adjusted or changed based on one or more inputs detected by the accelerometer, gyroscope and magnetometer sensors. For example, the hands-free telephonic communication capabilities may be enabled upon detection that the user has started biking.

Figure 2D:
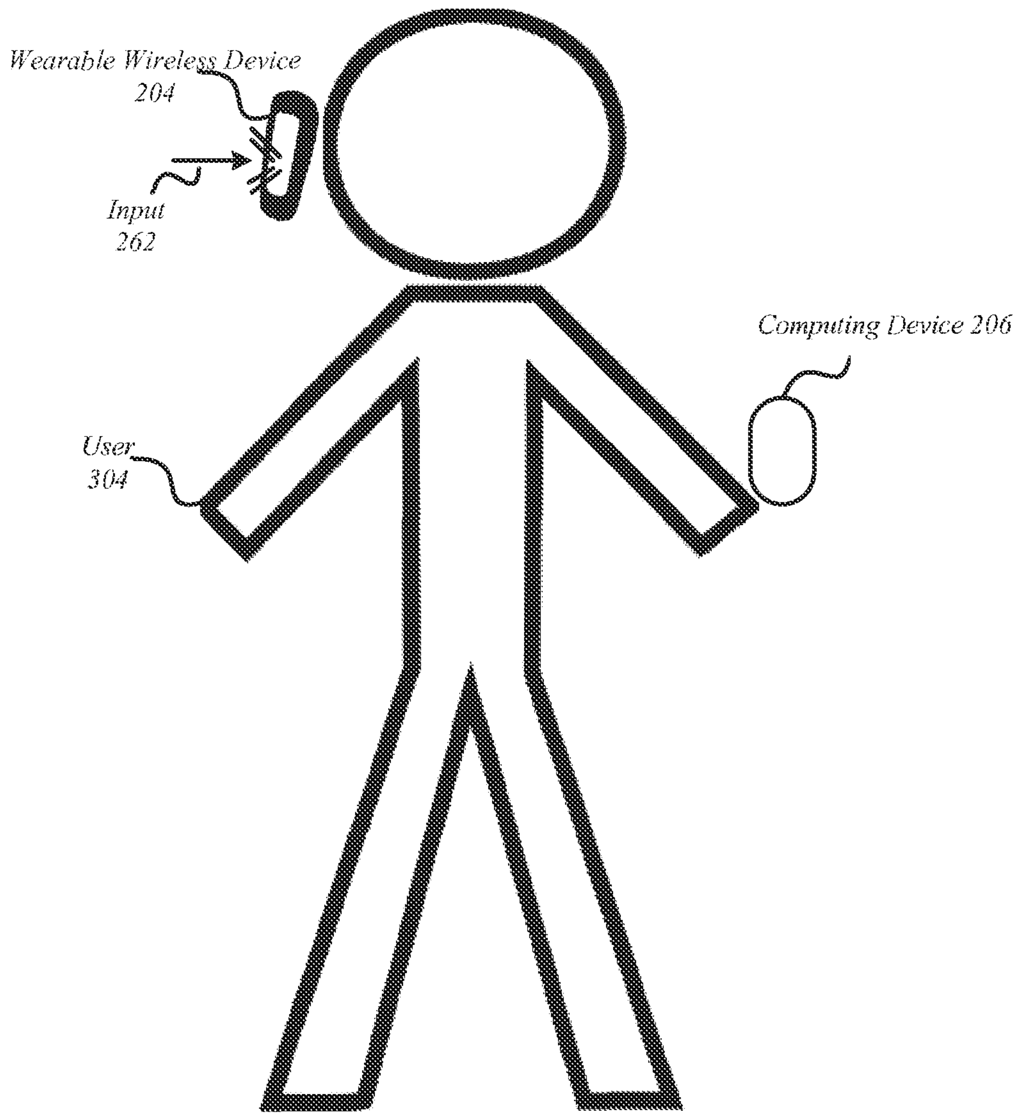
FIG. 2D illustrates an exemplary embodiment of a fourth input detection diagram.

FIG. 2D illustrates an exemplary embodiment of an input detection diagram 260 including a wearable wireless device 202 coupled with or attached to a user 208. Further, the wearable wireless device 202 may be coupled with computing device 206 via a communication link, such as communication link 104 of FIG. 1. The input detection diagram illustrates the wearable wireless device 202 detecting one input 262. However, various embodiments are not limited to the detection of only a single input and the wearable wireless device 202 may detect any number of inputs.

In various embodiments, input 262 may be a sound input detected by a microphone of the wearable wireless device 202. The sound input 262 may be a voice command or an ambient sound of the environment in which the user 208 is in. The detection of the sound input 262 may trigger one or more events on the wearable wireless device 202, such as determining an environment context of the user 208 switching modes of operation, and changing settings and configurations on the wearable wireless device 202.

For example in one embodiment, a user 208 may say a voice command that may be detected by a microphone phone of the wearable wireless device 202. The voice command may cause one or more events to occur on the wearable wireless device 202. More specifically, the wearable wireless device 202 may include voice recognition algorithms to determine a voice command spoken by a user and then cause the event associated with the voice command to occur. In some embodiments, the wearable wireless device 202 may be in a lower power mode, but may “listen” for voice commands issued by the user 208. Upon receiving the voice command, the wearable wireless device 202 may exit the lower power mode and a processor may execute instructions to cause the event to occur.

In another example, the wearable wireless device 202 may determine an environmental context based on the ambient sound detected. In various embodiments a processor may use audio classification algorithms to determine a setting or context of the user based on sound input received. The environmental context may include determining whether the user 208 is in a bar, on a busy street, in a conversation, in a car, in a windy location, and so forth.

The environmental context may be used to cause an event on the wearable wireless device 202, such as changing one or more settings and configurations, increasing or decreasing an audio output volume, changing the mode of operation from a full power mode of operation to lower power mode of operation, or vice versa. Other settings may also be adjusted such as increasing or decreasing a ringer volume. The environmental context may also be communicated with the computing device 206.

Figure 2E:
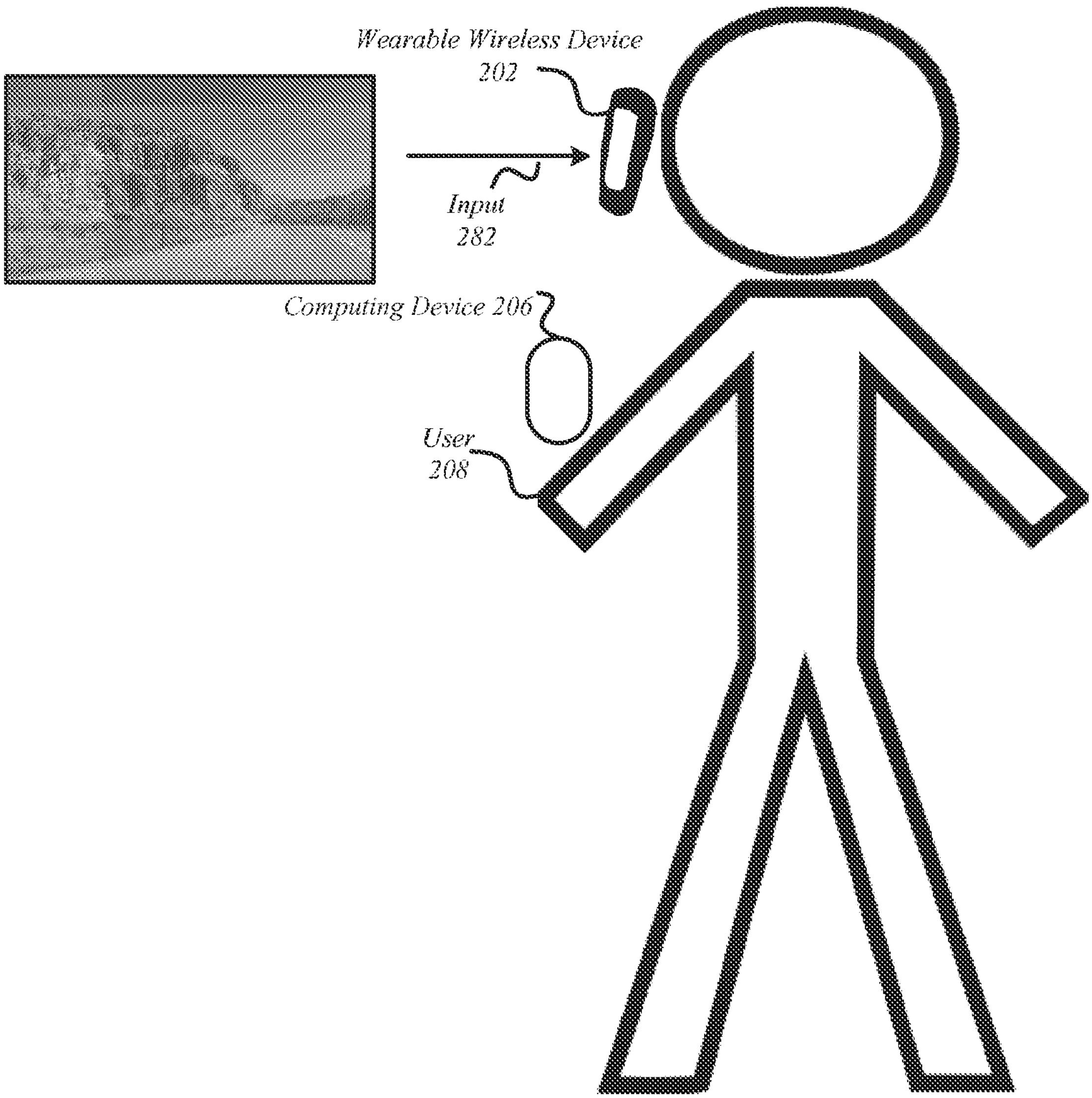
FIG. 2E illustrates an exemplary embodiment of a fifth input detection diagram.

FIG. 2E illustrates an exemplary embodiment of an input detection diagram 280 including a wearable wireless device 202 in coupled with or attached to a user 208. Further, the wearable wireless device 202 may be coupled with computing device 206 via a communication link, such as communication link 104 of FIG. 1. The input detection diagram illustrates the wearable wireless device 202 detecting one input 282.

In various embodiments, input 282 may be an image input detected by a camera of the wearable wireless device 202. The image input 282 may be of the environment in which the user 208 is in. The image input 262 may be also be used to determine the environmental context of the user 208 and may trigger one or more events on the wearable wireless device 202.

More specifically, the wearable wireless device 202 may determine an environmental context using one or more image detection algorithms. The environmental context may include determining whether the user 208 is in a bar, on a busy street, in a conversation, in a car, in a windy location, and so forth.

The environmental context may be used to cause an event on the wearable wireless device 202 such as an event previously described above. In various embodiments, the image input 282 may be used in conjunction with the sound input 262 of FIG. 2D to create a more accurate environmental context for the user 208.

Although the above recited exemplary embodiments discuss various sensor input trigger specific events on the wearable wireless device 202, various embodiments are not limited in this manner. Any sensor input may cause any of the events on the wearable wireless device 202. More specifically, each of the sensor inputs may be associated with an event in memory, and upon detection of the sensor input the associated event may be invoked by a processor reading instructions from the memory. In some embodiments, one input may be associated with one event. However, one event may also be associated with more than one event and more than one input may be associated with a single event. Any combination of inputs and events may be defined in memory.

Figure 3:
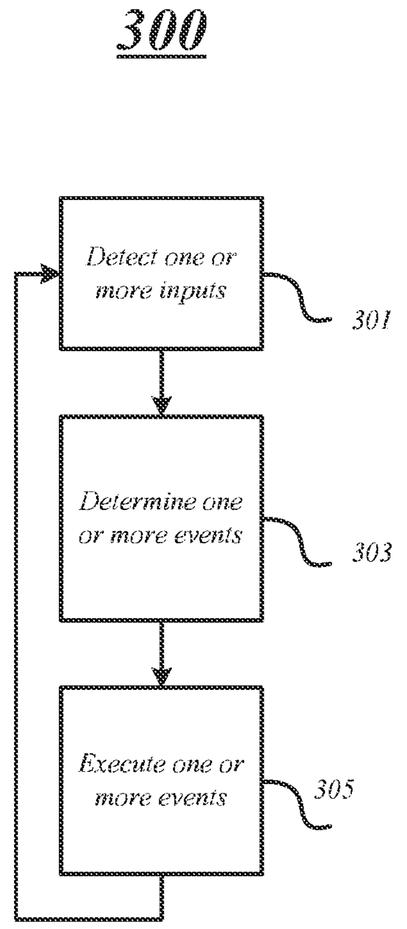
FIG. 3 illustrates an embodiment of a first logic flow diagram.

FIG. 3 illustrates an embodiment of a first logic flow 300 for processing one or more inputs on a wearable wireless device. The logic flow 300 may be representative of some or all of the operations executed by one or more embodiments described herein. For example, the logic flow 300 may illustrate operations performed by the systems 100 and 400.

At block 301, one or more inputs may be detected by one or more sensors for a wearable wireless device. The one or more inputs may include sensor inputs such as a motion, a position, a direction, proximity to a user or person, a sound, a biometric such as a heart-rate or body temperature, an image and so forth. As previously discussed, the wearable wireless device may include any number of sensors and may detect any number of inputs.

In some embodiments, the one or more inputs may be processed at block 303. More specifically, the wearable wireless device including a processor may receive input information from the one or more sensors and may process the input information to determine which one or more inputs were received. Further, the processor may determine one or more events to execute on the wearable wireless device based on the one or more inputs and may execute one or more instructions to cause the one or more events at block 305.

In various embodiments, an event may include changing various settings, configurations and information on the wearable wireless device. In addition, the event may include communicating information with a coupled computing device. The information may be information detected by the one or more sensors.

More specifically and in one example, a sound output for a speaker of the wearable wireless device may be adjusted based on the one or more inputs. In another example, the wearable wireless device may switch from a lower power state to a full power state, or vice versa, based on the one or more inputs. In a third example, telephonic communication may be enabled or disabled based on the one or more inputs. In a fourth example, information may be sent to and received from a coupled computing device based on the one or more inputs. In a fifth example, the one or more inputs may cause the wearable wireless device to answer or hang-up a phone call.

In some embodiments, the wearable wireless device may determine an environmental context and a physical context based on the one or more inputs. As previously discussed, the environmental context may include determining the environment or surroundings of the user of the wearable wireless device, such as being at a bar, on the street, at work, at a sporting event, etc. based on the one or more inputs. For example, sound information may be analyzed by an audio classification algorithm to determine the user's setting. In another example, image information may be analyzed by an image detection algorithm to determine the user's setting. In some embodiments, a combination of inputs may be used to determine the environmental context, such as the sound input and the image input.

A physical context may also be determined based on one or more inputs. The physical context may include whether the user is running, walking, jogging, biking, standing without motion and made be based on motion information, position information, direction information, or combination thereof.

In some embodiments, the environmental context and physical context may be used to cause one or more events on the wearable wireless device. For example, if the environmental context indicates that the user is a noisy environment, the volume of sound output may be increased on the wearable wireless device. In another example, if the environmental context indicates that the user is a quite environment, the volume of sound output may be decreased. In another example, if the physical context indicates that the user is running or jogging, telephonic communication may be enabled on the wearable wireless device for hands-free communication. Various embodiments are not limited to these examples and other events may be executed on the wearable wireless device based on the environmental context and physical context.

Figure 4:
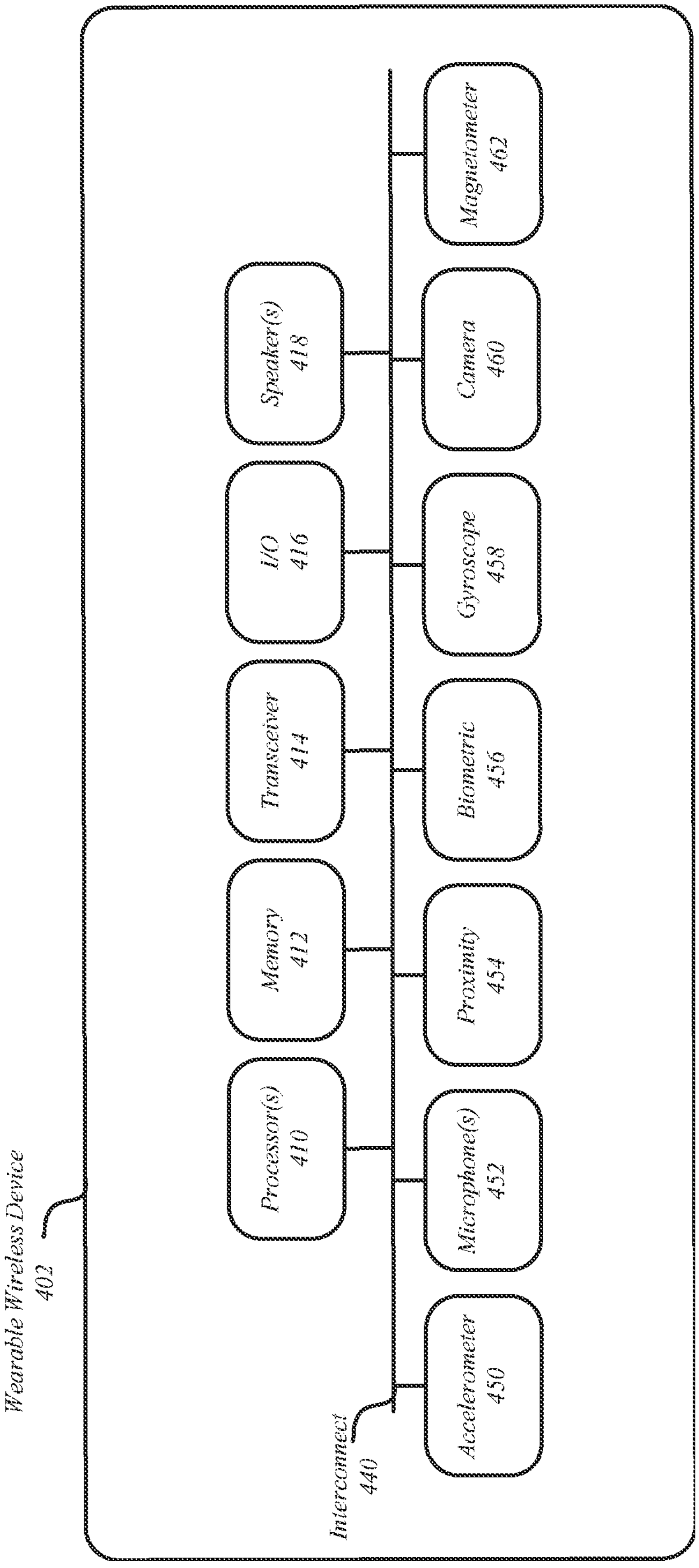
FIG. 4 illustrates an embodiment of second system.

FIG. 4 illustrates an embodiment of a system 400 including a wearable wireless device 402. The wearable wireless device 402 may include any number of sensors and components and may be the same or similar to the wearable wireless device 102 in FIG. 1. In some embodiments, the wearable wireless device 402 may include one or more processors 410, a memory 412, a transceiver 414, an input/output (I/O) device 416 and a speaker 418. In various embodiments, the wearable wireless device 402 may include a battery (not shown) to provide power to the device. The wearable wireless device 402 may also include any number of sensors such as, an accelerometer 450, a microphone 452, a proximity sensor 454, a biometric sensor 456, a gyroscope sensor 458, a camera 460 and a magnetometer sensor 462. The wearable wireless device 402 may also include an interconnect 440 for the components and sensors to communicate with each other. The interconnect 440 may be any type of bus, trace, and so forth.

In various embodiments, the processor(s) 410 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processor 410 may be connected to and communicate with the other elements and components of the computing system via an interconnect 440, such as one or more buses, control lines, and data lines.

In one embodiment, wearable wireless device 402 may include a memory component 412 to couple to processor 410. In various embodiments, the memory component 412 may store data, information and instructions for the wearable wireless device 402. Memory component 412 may be coupled to processor 410 via interconnect 440, or by a dedicated communications bus between processor 410 and memory component 412, as desired for a given implementation. Memory component 412 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory component 412 can store instructions and data momentarily, temporarily, or permanently. The memory component 412 may also store temporary variables or other intermediate information while the processor 410 is executing instructions. The memory component 412 is not limited to storing the above discussed data and may store any type of data.

The wearable wireless device 202 may also include a transceiver 414. Transceiver 414 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. Moreover, transceiver 414 may communicate information in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols. Other examples may include systems using infrared techniques or near-field communication techniques and protocols, such as electro-magnetic induction (EMI) techniques. In communicating across such networks, transceiver 414 may operate in accordance with one or more applicable standards in any version. The embodiments are not limited in this context.

The wearable wireless device 402 may include input/output (I/O) component 416 having at least one of an input device, such as a touchscreen, a touch sensitive device. The I/O component 416 may be used to input any information or data into the wearable wireless device 402. In some embodiments, the I/O component 416 may include one or more components to output information to a user. For example, the I/O component 416 may include a haptic feedback device to output a vibration. In various embodiments, the I/O component 416 may be used to notify a user of a change in settings, configuration or the like.

In some embodiments, the wearable wireless device 402 may include one or more speakers 418 for output sound information to a user. The sound information may include telephone voice information, audio cue information, turn-by-turn direction information, signaling information and so forth. The sound information may be received from a coupled computing device over communication link via transceiver 414 or stored in and played from the memory component 412.

The accelerometer 450 may detect one or more motion inputs and provide motion information to one or more components such as the processor 410 for processing the motion information. More specifically, the accelerometer 450 may convert sensed acceleration into an analog or digital value that represents the magnitude, and in some embodiments the sign (which of two opposite directions along the axis of measurement), of the sensed acceleration. This motion information may then be communicated to the processor 410 or anything component processing. For example, the processor 410 may execute one or more instructions to cause one or more events on the wearable wireless device 402.

In various embodiments, the wearable wireless device 402 may include a microphone 452 to detect and receive sound information. More specifically, microphone 452 may convert received sound information into one or more electrical signals. In various embodiments, microphone 452 may use electromagnetic induction (dynamic microphone), capacitance change (condenser microphone), piezoelectric generation, or light modulation to produce an electrical voltage signal from mechanical vibration. The electrical signals may be communicated to the processor 410 and the processor 410 may execute one or more instructions to cause one or more events on the wearable wireless device 402.

The wearable wireless device 402 may also include a proximity sensor 454 to detect an object within a threshold distance without physical contact. In some embodiments, the proximity sensor 454 may emit an electromagnetic field or a beam of electromagnetic radiation (infrared, for instance), and looks for changes in the field or return signal to detect the object. The proximity sensor 454 may be any type of proximity sensor including a capacitive photoelectric sensor, an inductive proximity sensor, a capacitive displacement sensor, a Doppler effect sensor, an eddy-current sensor, an inductive sensor, a laser rangefinder sensor, a magnetic sensor, a passive optical sensor, a passive thermal sensor, a photocell sensor, a Radar sensor, a Sonar sensor, an ultrasonic sensor, or the like.

The proximity sensor 454 may detect one or more objects such as a user's body part within a threshold distance of the sensor. In various embodiments, the threshold distance may be the capability of the sensor, may be a default distance, or be may configured by a user of the wearable wireless device 402. Upon detection of the object within the threshold distance information may be sent to the processor 410 for processing.

In some embodiments, the wearable wireless device 402 may include a biometric sensor 456 to detect biometric information. In some embodiments, the biometric sensor 456 may be a heart rate or beat monitor and may detect electrical signal emitted by your heart. The biometric sensor 456 may also be a thermometer may detect body temperature. Various embodiments may include both a heartbeat monitor and a body thermometer.

The wearable wireless device 402 may also include a gyroscope 458 to detect position and orientation. More specifically, gyroscope 458 is a device for measuring position and orientation, based on the principles of angular momentum. The position information and orientation information may be communicated to one or more components of the wearable wireless device 402, such as processor 410. The processor 410 may use the information to execute one or more instructions to cause an event on the wearable wireless device 202.

The wearable wireless device 402 may also include a camera 460 to detect image information. More specifically the camera 460 may include one or more sensors that turns light into discrete signals. The brighter the image at a given point on the sensors the larger the value that is read for that pixel. The image information may be communicated with one or more components of the wearable wireless device 402, such as processor 410. The processor 410 may use the information to execute one or more instructions to cause an event on the wearable wireless device 202.

In some embodiments, the wearable wireless device 402 may include a magnetometer sensor 462 to detect direction. More specifically, the magnetometer 462, also known as a gaussmeter, may measure the strength and the direction of magnetic fields, such as the earth's magnetic field. In some embodiments, the magnetometer sensor 462 may be used as a compass to determine or detect the direction of the user and wearable wireless device 402. The direction information may be communicated with one or more components of the wearable wireless device 402, such as processor 410. The processor 410 may use the information to execute one or more instructions to cause an event on the wearable wireless device 202.

Figure 5:
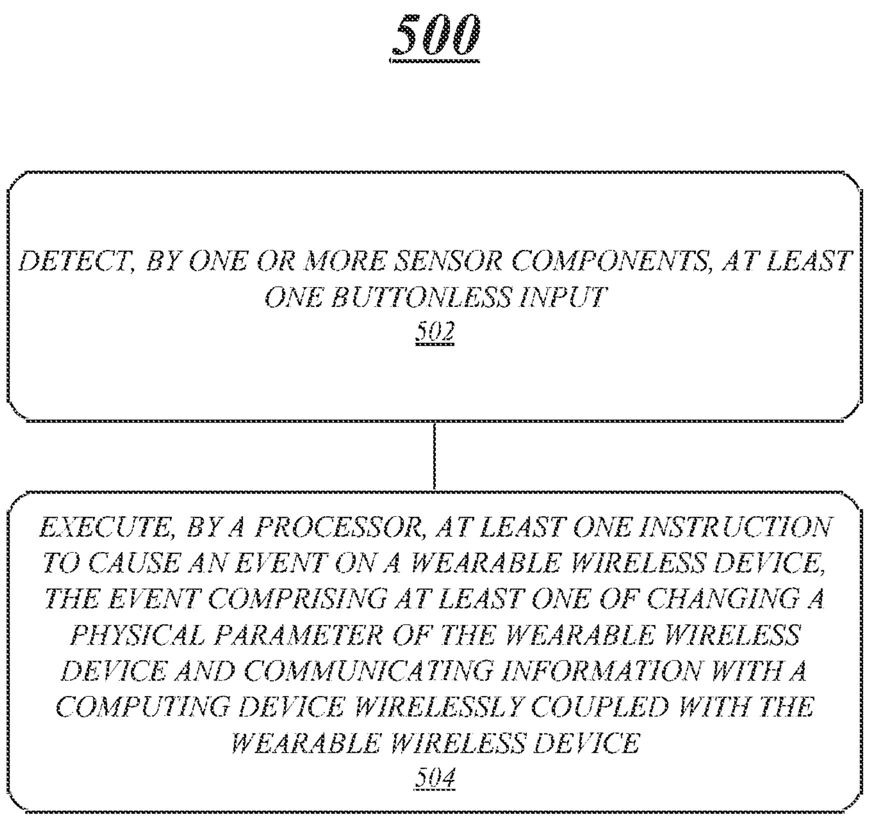
FIG. 5 illustrates an embodiment of a second logic flow diagram.

FIG. 5 illustrates an exemplary embodiment of logic flow 500. The logic flow 500 may be representative of some or all of the operations executed by one or more embodiments described herein. For example, the logic flow 500 may illustrate operations performed by the system 100 and 400.

In the illustrated embodiment shown in FIG. 5, the logic flow 500 may include detecting, by one or more sensor components, at least one sensor input at block 502. The sensor inputs may include a motion, a position, a direction, proximity to a user or person, a sound, a biometric such as a heart-rate or body temperature, an image and so forth. As previously discussed, the wearable wireless device may be devoid of any buttons that a user may interact with and may include any number of sensors and may detect any number of sensor inputs.

At block 504, the logic flow 500 may include executing, by a processor, at least one instruction to cause an event on a wearable wireless device, the event comprising at least one of changing a physical parameter of the wearable wireless device and communicating information with a computing device wirelessly coupled with the wearable wireless device. As previously discussed, a processor may determine one or more events to execute on a wearable wireless device based on the one or more inputs and may execute one or more instructions to cause the one or more events.

The one or more events may include changing various physical parameters, settings, configurations and information including changing a volume, answering or hanging-up a telephone call, enabling or disable music playback, switching between modes of operation including power modes (on, off, lower power, full power, etc.) and hands-free modes, and so forth. In addition, the event may include communicating information with a coupled computing device. The information may be information detected by the one or more sensors, such as motion, position, and direction information.

In one example, a sound output for a speaker of the wearable wireless device may be adjusted based on the one or more inputs. In another example, the wearable wireless device may switch from a lower power state to a full power state, or vice versa, based on the one or more inputs. In a third example, telephonic communication may be enabled or disabled based on the one or more inputs. In a fourth example, information may be sent to and received from a coupled computing device based on the one or more inputs. In a fifth example, the one or more inputs may cause the wearable wireless device to answer or hang-up a phone call.

In some embodiments, the wearable wireless device may determine an environmental context and a physical context based on the one or more inputs. As previously discussed, the environmental context may include determining the environment or surroundings of the user of the wearable wireless device, such as being at a bar, on the street, at work, at a sporting event, etc. based on the one or more inputs. For example, sound information may be analyzed by an audio classification algorithm to determine the user's surroundings. In another example, image information may be analyzed by an image detection algorithm to determine that the user's surrounds. In some embodiments, a combination of inputs may be used to determine the environmental context, such as the sound input and the image input.

A physical context may also be determined based on one or more inputs. The physical context may include whether the user is running, walking, jogging, biking, standing without motion and made be based on motion information, position information, direction information, or combination thereof.

In some embodiments, the environmental context and physical context may be used to cause one or more events on the wearable wireless device. For example, if the environmental context indicates that the user is a noisy environment, the volume of sound output may be increased on the wearable wireless device. In another example, if the environmental context indicates that the user is a quite environment, the volume of sound output may be decreased. In another example, if the physical context indicates that the user is running or jogging, telephonic communication may be enabled on the wearable wireless device for hands-free communication. Various embodiments are not limited to these examples and other events may be executed on the wearable wireless device based on the environmental context and physical context.

Figure 6:
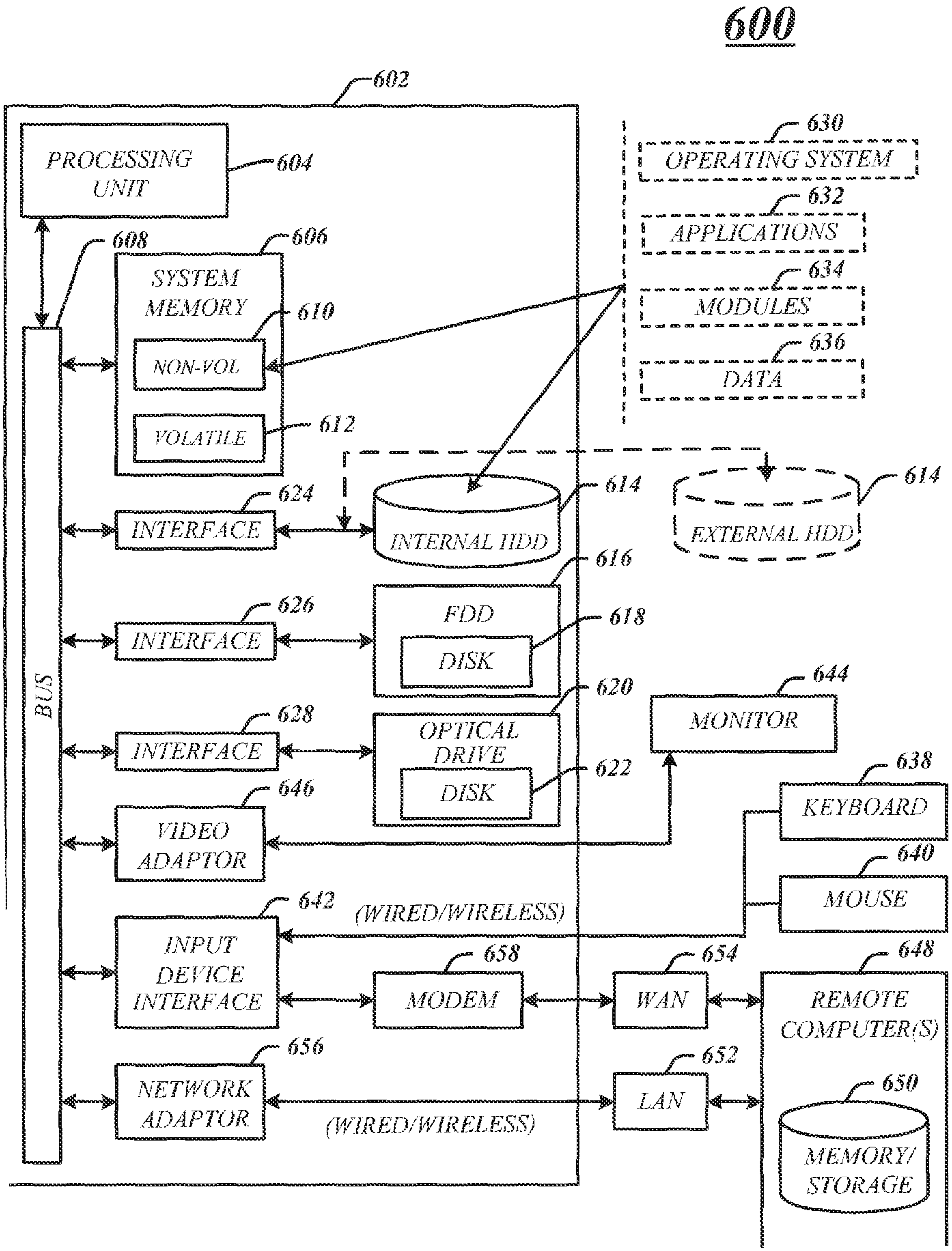
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of or wearable wireless device 102, 202, and 402.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the platform processing device 110 shown in FIG. 1.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 105.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 100 as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-one (1-31) provided below are intended to be exemplary and non-limiting.

In a first example, an apparatus including a wearable wireless device, headset, etc. may include processing circuitry, a transceiver coupled with the processing circuitry, one or more sensor components coupled with the processing circuitry. The apparatus may include logic, at least a portion of which is in hardware, the logic to detect at least one sensor input via the one or more sensor components and to cause an event on the wearable wireless device, the event comprising at least one of changing a physical parameter on the wearable wireless device and communicating information with a computing device wirelessly coupled with the wearable wireless device.

In a second example and in furtherance of the first example, an apparatus may include the one or more sensor components comprising an accelerometer to detect at least one sensor input comprising a touch input and a microphone to detect at least one sensor input comprising a sound input, and the physical parameter comprising a changing a volume, answering a telephone call or hanging-up a telephone call.

In a third example and in furtherance of any of the previous examples, an apparatus may include the one or more sensors comprising a proximity sensor to detect at least one sensor input comprising detecting a body part of a user within a threshold distance to the wearable wireless device and biometric sensor to detect at least one sensor input comprising detecting a temperature of the user or a heartbeat of a user, and the logic to cause the event comprising changing from a first mode of operation to a second mode of operation for the wearable wireless device based on the detected inputs.

In a fourth example and in furtherance of any of the previous examples, an apparatus may include, the logic to enable a microphone and a speaker for telephonic communication when changing from the first mode of operation to a second mode of operation.

In a fifth example and in furtherance of any of the previous examples, the apparatus in a lower power mode when in the first mode of operation and in a full power mode when in the second mode of operation and the logic to enable the full power mode for the wearable wireless device when changing from the first mode of operation to a second mode of operation.

In a sixth example and in furtherance of any of the previous examples, the apparatus may include the one or more sensor components comprising a gyroscope sensor to detect at least one sensor input comprising a position and a magnetometer sensor to detect at least one sensor input comprising a direction of the wearable wireless device, the logic to cause the event comprising communicating the information comprising the position and the direction via the transceiver.

In a seventh example and in furtherance of any of the previous examples, an apparatus may include the transceiver to receive at least one of turn-by-turn direction information and audio cue information from the coupled computing device in response to the logic communicating the detected position and direction.

In an eighth example and in furtherance of any of the previous examples, an apparatus may include the logic to determine a physical context based on the detected position and direction.

In a ninth example and in furtherance of any of the previous examples, an apparatus may include the logic to enable or disable a lower power mode for the wearable wireless device based on the physical context.

In a tenth example and in furtherance of any of the previous examples, an apparatus may include the one or more sensor components comprising an image sensor to detect one or more sensor inputs comprising an image input and a microphone to detect one or more sensor inputs comprising a sound input, and the logic to determine an environmental context based the image input, sound input, or both.

In an eleventh example and in furtherance of any of the previous examples, an apparatus may include the logic to enable or disable a lower power mode for the wearable wireless device based on a physical context, an environmental context, or both.

In a twelfth example and in furtherance of any of the previous examples, a method may include detecting, by one or more sensor components, at least one sensor input and executing, by a processor, at least one instruction to cause an event on a wearable wireless device, the event comprising at least one of changing a physical parameter on the wearable wireless device and communicating information with a computing device wirelessly coupled with the wearable wireless device.

In a thirteenth example and in furtherance of any of the previous examples, a method may include the detecting at least one sensor input comprising detecting a touch input and a sound input, and the executing comprising causing one or more of changing a volume on wearable wireless device, answering or hanging-up a telephone call on the wearable wireless device or adjusting music playback on the wearable wireless device based on the detected inputs.

In a fourteenth example and in furtherance of any of the previous examples, a method may include the detecting at least one sensor input comprising detecting a body part of a user within a threshold distance of the wearable wireless device and detecting a temperature of the user or a heart-rate of a user, and the executing comprising enabling a microphone and a speaker for telephonic communication.

In a fifteenth example and in furtherance of any of the previous examples, a method may include the detecting at least one sensor input comprising detecting a position input and a direction input of the wearable wireless device, and the executing comprising causing communication of the detected position input and direction input with a coupled computing device via the transceiver.

In a sixteenth example and in furtherance of any of the previous examples, a method may include receiving at least one of turn-by-turn direction information and audio cue information from the coupled computing device based on the communicated position input and direction input.

In a seventeenth example and in furtherance of any of the previous examples, a method may include determining a physical context based on the position and the direction input.

In an eighteenth example and in furtherance of any of the previous examples, a method may include the detecting the sensor input comprising detecting a sound input and an image input and the method may include determining an environmental context based on sound input, the image input, or both.

In a nineteenth example and in furtherance of any of the previous examples, a method may include enabling or disabling a lower power mode for the wearable wireless device based one or more of a physical context and an environmental context.

In a twentieth example and in furtherance of any of the previous examples, an article may include a computer-readable storage medium comprising a plurality of instructions that when executed enable a wearable wireless device to detect at least one sensor input and execute at least one instruction to cause an event on a wearable wireless device, the event comprising at least one of changing a physical parameter on the wearable wireless device and communicating information with a computing device wirelessly coupled with the wearable wireless device.

In a twenty-first example and in furtherance of any of the previous examples, an article may include a computer-readable storage medium comprising a plurality of instructions that when executed enable the wearable wireless device to detect at least one sensor input comprising detecting a touch input and a sound input, and to execute comprising causing one or more of changing a volume on wearable wireless device, answering or hanging-up a telephone call on the wearable wireless device or adjusting music playback on the wearable wireless device based on the detected inputs.

In a twenty-second example and in furtherance of any of the previous examples, an article may include a computer-readable storage medium comprising a plurality of instructions that when executed enable the wearable wireless device to detect at least one sensor input comprising detecting a body part of a user within a threshold distance of the wearable wireless device and detecting a temperature of the user or a heart-rate of a user, to execute comprising enabling a microphone and a speaker for telephonic communication.

In a twenty-third example and in furtherance of any of the previous examples, an article may include a computer-readable storage medium comprising a plurality of instructions that when executed enable the wearable wireless device to detect at least one sensor input comprising detecting a position input and a direction input of the wearable wireless device, and to execute comprising causing communication of the detected position input and direction input with a coupled computing device via the transceiver.

In a twenty-fourth example and in furtherance of any of the previous examples, an article may include a computer-readable storage medium comprising a plurality of instructions that when executed enable the wearable wireless device to determine a physical context based on the position input and direction input.

In a twenty-fifth example and in furtherance of any of the previous examples, an article may include a computer-readable storage medium comprising a plurality of instructions that when executed enable the wearable wireless device to detect the sensor input comprising detecting a sound input and an image input and to determine an environmental context based on the sound input, the image input, or both.

In a twenty-sixth example and furtherance of any of the previous examples, an apparatus may include means for detecting at least one sensor input and means for executing at least one instruction to cause an event on a wearable wireless device, the event comprising at least one of changing a physical parameter on the wearable wireless device and communicating information with a computing device wirelessly coupled with the wearable wireless device.

In a twenty-seventh example and in furtherance of any of the previous examples, an apparatus may include means for detecting at least one sensor input comprising means for detecting a touch input and a sound input, and means for executing comprising means for causing one or more of changing a volume on wearable wireless device, means for answering or hanging-up a telephone call on the wearable wireless device or means for adjusting music playback on the wearable wireless device based on the detected inputs.

In a twenty-eighth example and in furtherance of any of the previous examples, an apparatus may include means for detecting at least one sensor input comprising means for detecting a body part of a user within a threshold distance of the wearable wireless device and means for detecting a temperature of the user or a heart-rate of a user; and the means for executing comprising means for enabling a microphone and a speaker for telephonic communication.

In a twenty-ninth example and in furtherance of any of the previous examples, an apparatus may include means for detecting at least one sensor input comprising means for detecting a position input and a direction input of the wearable wireless device; and means for executing comprising means for causing communication of the detected position input and direction input with a coupled computing device via the transceiver.

In a thirtieth example and in furtherance of any of the previous examples, an apparatus may include means for determining a physical context based on the position input and direction input.

In a thirty-first example and in furtherance of any of the previous examples, an apparatus may include means for detecting the sensor input comprising means for detecting a sound input and an image input the apparatus may include means for determining an environmental context based on the sound input, the image input, or both.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A wireless watch device comprising:

a speaker;

a microphone to detect a sound input including a voice command or ambient sound input corresponding to an environment of a user of the wireless watch device;

a biometric sensor;

a touchscreen;

one or more processors;

a gyroscope sensor coupled to the one or more processors;

an accelerometer sensor coupled to the one or more processors;

a wireless local area network (WLAN) radio coupled to the one or more processors, the WLAN radio to transmit and receive signals using a wireless communications technique to be implemented in a WLAN;

a wireless personal area network (WPAN) radio coupled to the one or more processors, the WPAN radio to transmit and receive signals using a wireless communications technique to be implemented in a WPAN; and a cellular radio coupled to the one or more processors, the cellular radio to transmit and receive signals using a wireless communications technique to be implemented in a cellular network;

wherein the one or more processors are configured to, based on input from at least one of the gyroscope sensor or the accelerometer sensor:

determine a physical context of the user, the physical context to indicate that the user is running or to indicate that the user is walking, and cause one of the WLAN radio, the WPAN radio or the cellular radio to communicate the physical context with a smart phone;

cause telephonic communications on the wireless watch device; and cause one of the WLAN radio, the WPAN radio or the cellular radio to communicate with the smart phone information that is based on both the ambient sound input and said input from at least one of the gyroscope sensor or the accelerometer sensor.

2. The wireless watch device of claim 1, wherein the one or more processors are further to use an audio classification algorithm to determine a context of the user based on the ambient sound input.

3. The wireless watch device of claim 2, wherein the one or more processors are further to control a sound output from the speaker based on the information that is based on both the ambient sound input and said input from at least one of the gyroscope sensor or the accelerometer sensor.

4. The wireless watch device of claim 1, wherein the one or more processors are to cause communication with the smart phone based on input from the biometric sensor, the biometric sensor to detect a temperature of the user or a heartbeat of the user.

5. The wireless watch device of claim 1, wherein the one or more processors are further configured to enable and to disable a lower power mode for the wireless watch device based on the input from at least one of the gyroscope sensor or the accelerometer sensor.

6. A wireless watch device comprising:

means for transmitting and receiving signals using a wireless communications technique to be implemented in a wireless local area network (WLAN);

means for transmitting and receiving signals using a wireless communications technique to be implemented in a wireless personal area network (WPAN);

means for transmitting and receiving signals using a wireless communications technique to be implemented in a cellular network;

means for detecting a sound input including a voice command or ambient sound input corresponding to an environment of a user of the wireless watch device;

means for, based on input from at least one of a gyroscope sensor or an accelerometer sensor, determining a physical context of the user, the physical context to indicate that the user is running or to indicate that the user is walking;

means for causing wireless communication with a smart phone including information on the physical context using one of the WLAN, the WPAN or the cellular network;

means for, based on input from at least one of the gyroscope sensor or the accelerometer sensor, causing telephonic communications on the wireless watch device; and means for causing wireless communication with the smart phone of information that is based on both the ambient sound input and input from at least one of the gyroscope sensor or the accelerometer sensor.

7. The wireless watch device of claim 6, further including means for using an audio classification algorithm to determine a context of the user based on the ambient sound input.

8. The wireless watch device of claim 7, further including means for controlling a sound output from the wireless watch device based on the information that is based on both the ambient sound input and said input from at least one of the gyroscope sensor or the accelerometer sensor.

9. The wireless watch device of claim 6, further including:

means for detecting a heart rate of the user;

means for detecting a body temperature of the user; and means for causing wireless communication with the smart phone based on input from at least one of the means for detecting the heart rate and the means for detecting a body temperature.

10. The wireless watch device of claim 6, further including means for enabling and disabling a lower power mode for the wireless watch device based on the input from at least one of the gyroscope sensor or the accelerometer sensor.

11. A wireless watch device comprising:

a speaker;

a microphone to detect a sound input including a voice command or ambient sound input corresponding to an environment of a user of the wireless watch device;

a biometric sensor;

a touchscreen;

one or more processors;

one or more sensors coupled to the one or more processors, the one or more sensors to detect at least one of motion input, position input or direction input for the user;

a wireless local area network (WLAN) radio coupled to the one or more processors, the WLAN radio to transmit and receive signals using a wireless communications technique to be implemented in a WLAN;

a wireless personal area network (WPAN) radio coupled to the one or more processors, the WPAN radio to transmit and receive signals using a wireless communications technique to be implemented in a WPAN; and a cellular radio coupled to the one or more processors, the cellular radio to transmit and receive signals using a wireless communications technique to be implemented in a cellular network;

wherein the one or more processors are to, based on at least one of motion input, position input or direction input from said one or more sensors:

determine a physical context of the user based on information from said one or more sensors, the physical context to indicate that the user is running or to indicate that the user is walking, and cause one of the WLAN radio, the WPAN radio or the cellular radio to communicate the physical context with a smart phone on a wireless communication link;

cause telephonic communications on the wireless watch device; and cause one of the WLAN radio, the WPAN radio or the cellular radio to communicate with the smart phone on the wireless communication link information that is based on both the ambient sound input and said at least one of motion input, position input or direction input from said one or more sensors.

12. The wireless watch device of claim 11, wherein the one or more processors are further to use an audio classification algorithm to determine a context of the user based on the ambient sound input.

13. The wireless watch device of claim 12, wherein the one or more processors are further to control a sound output from the speaker based on the information that is based on both the ambient sound input and said at least one of motion input, position input or direction input from said one or more sensors.

14. The wireless watch device of claim 11, wherein the one or more processors are to cause communication with the smart phone based on input from the biometric sensor, the biometric sensor to detect at least one of a temperature of the user or a heartbeat of the user.

15. The wireless watch device of claim 11, wherein the one or more processors are further configured to enable and to disable a lower power mode for the wireless watch device based on said at least one of motion input, position input or direction input from said one or more sensors.

16. A wireless watch device comprising:

means for detecting at least one of motion input, position input or direction input for a user of the wireless watch device;

means for transmitting and receiving signals using a wireless communications technique to be implemented in a wireless local area network (WLAN);

means for transmitting and receiving signals using a wireless communications technique to be implemented in a wireless personal area network (WPAN);

means for transmitting and receiving signals using a wireless communications technique to be implemented in a cellular network;

means for detecting a sound input including a voice command or ambient sound input corresponding to an environment of the user;

means for, based on at least one of motion input, position input or direction input from one or more sensors, determining a physical context of a user of the wireless watch device based on information from said one or more sensors, the physical context to indicate that the user is running or to indicate that the user is walking;

means for, based on said at least one of motion input, position input or direction input from said one or more sensors, determining a physical context of the user, the physical context to indicate that the user is running or to indicate that the user is walking;

means for causing wireless communication with a smart phone including information on the physical context using one of the WLAN, the WPAN or the cellular network;

means for, based on said at least one of motion input, position input or direction input from said one or more sensors, causing telephonic communications on the wireless watch device; and means for causing wireless communication with the smart phone of information that is based on both the ambient sound input and said at least one of motion input, position input or direction input from said one or more sensors.

17. The wireless watch device of claim 16, further including means for using an audio classification algorithm to determine a context of the user based on the ambient sound input.

18. The wireless watch device of claim 17, further including means for controlling a sound output from the wireless watch device based on the information that is based on both the ambient sound input and said at least one of motion input, position input or direction input from said one or more sensors.

19. The wireless watch device of claim 16, further including means for causing wireless communication with the smart phone based on input from the biometric sensor, the biometric sensor to detect at least one of a temperature of the user or a heartbeat of the user.

20. The wireless watch device of claim 16, further including:

means for detecting a heart rate of the user;

means for detecting a body temperature of the user; and means for causing wireless communication with the smart phone based on input from at least one of the means for detecting the heart rate and the means for detecting a body temperature.

* * * * *